United States Patent Office 3,737,454
Patented June 5, 1973

3,737,454
RACEMIZATION OF OPTICALLY ACTIVE AMMO-
NIUM N-ACETYL-α-AMINOPHENYLACETATE
Ichiro Chibata and Shigeki Yamada, Osaka, and Masao
Yamamoto, Kyoto, Japan, assignors to Tanabe Seiyaku
Co., Ltd., Osaka, Japan
No Drawing. Filed Aug. 31, 1970, Ser. No. 68,584
Claims priority, application Japan, Sept. 10, 1969,
44/71,752
Int. Cl. C07c *103/12*
U.S. Cl. 260—518 R                       7 Claims

ABSTRACT OF THE DISCLOSURE

Optically active ammonium N-acetyl-α-aminophenylacetate is racemized by heating. The heating is preferably conducted at temperatures from about 100° C. to about 180° C.

---

This invention relates to a process for racemization of optically active ammonium N-acetyl-α-aminophenylacetate.

α-aminophenylacetic acid, particularly its optically active enantiomer is an important starting material for the synthesis of penicillin compounds. For example, D-α-aminophenylacetic acid is useful as the starting compound for the synthesis of aminobenzylpenicillin. We have found that, when DL-α-aminophenylacetic acid is converted into its novel derivative, i.e. ammonium N-acetyl-DL-α-aminophenylacetate, the said salt can be resolved readily into its optically active enantiomers by fractional crystallization. This method may be advantageously adapted to commercial production. However, the consumption of each of the optically active α-aminophenylacetates is usually equal. It is obvious that it would be advantageous to industry to accomplish the racemization of an optically active enantiomer of ammonium N-acetyl-α-aminophenylacetate directly.

The racemization of ammonium N-acetyl-α-aminophenylacetate has neither been reported nor suggested heretofore because the said salt is a new compound which was synthesized for the purpose of optical resolution. Although the racemization of organic compounds has been generally carried out by heating in the presence of an acid or alkali, ammonium N-acetyl-DL-α-aminophenylacetate was not recovered by known methods as it decomposed.

We have now found that optically active ammonium N-acetyl-α-aminophenylacetate can be readily converted into the racemic compound without decomposition by heating it without the addition of an acid or alkali.

This invention provides a novel and simple method for the racemization of an optically active ammonium N-acetyl-α-aminophenylacetate for the purpose of utilizing the said optical enantiomer again as the starting material for the resolution.

According to the present invention, the racemization reaction can be carried out simply by heating an optically active ammonium N-acetyl-α-aminophenylacetate in the presence or absence of water.

When water is not used for the reaction, a solid form of ammonium N-acetyl-DL-α-aminophenylacetate can be obtained as the reaction product, and in such case, the said DL-salt can be recovered from the reaction mixture without further treatment. The addition of water is preferred. It enables one to carry out the reaction more smoothly. However, its use makes necessary an additional treatment for recovering the DL-salt from the aqueous reaction mixture after the racemization reaction. The amount of water used affects the racemization speed. The higher the concentration of the solution, the greater will be the racemization speed. However, the proceeding of the said reaction per se is not susceptible to the amount of water therein. The racemization may be carried out at a temperature higher than about 10° C., especially higher than 140° C. Accordingly, it is preferred that the reaction be carried out in a sealed vessel under heat so that evaporation of ammonia and water can be avoided. The racemization speed increases with an increase in temperature. However, when the reaction temperature exceeds the melting point of the racemic N-acetyl-α-aminophenylacetate, the yield of the said compound is decreased due to decomposition thereof. In this respect, it is preferred to carry out the racemization at a temperature of from about 140° C. to about 180° C.

The degree of racemization (percent) of ammonium N-acetyl-D-α-aminophenylacetate is illustrated in Table 1, wherein the values were measured after heating a 10% aqueous solution of said compound in a sealed tube at the respective temperature for the therein stated period of time.

TABLE 1

| Hour | Temperature |   |   |   |
|---|---|---|---|---|
|  | 110° C. | 130° C. | 150° C. | 170° C |
| 2 |  |  | 46.3 | 91.1 |
| 4 |  |  | 75.2 | 100 |
| 6 |  | 9.7 | 33.2 | 89.1 |
| 10 |  |  | 49.2 | 97.3 |
| 20 |  | 17.2 | 74.0 |  |

Practical and preferred embodiments of the present invention are illustratively shown in the following examples.

EXAMPLE 1

1.00 g. of ammonium N-acetyl-L-α-aminophenylacetate is added to 10 ml. of distilled water. The mixture is heated at 160° C. for six hours in a sealed tube. The reaction mixture is concentrated to dryness and washed with a small amount of acetone. The crystals thus obtained are dried. 0.95 g. of ammonium N-acetyl-DL-α-aminophenylacetate is obtained. Yield: 95%. M.P. 186° C. (decomp.). Specific rotation: $[\alpha]_D^{25}=0.0°$ (c.=1, water).

When mixed with an authentic sample of ammonium N-acetyl-DL-α-aminophenylacetate, these crystals did not depress its melting point. The infrared absorption spectra of these crystals and the sample of ammonium N-acetyl-DL-α-aminophenylacetate were the same.

EXAMPLE 2

1.25 g. of ammonium N-acetyl-D-α-aminophenylacetate are added to 5 ml. of water, and the mixture is heated at 150° C. for six hours in a sealed tube. Insoluble material is removed by filtration. The filtrate is then concentrated to dryness. The residual crystals are washed with a small amount of acetone. 1.18 g. of ammonium N-acetyl-DL-α-aminophenylacetate are obtained. Yield: 94.4%, M.P. 185° C. (decomp.). Specific rotation: $[\alpha]_D^{25}=-1.0$ (c.=1, water). The degree of racemization: 99.5%.

EXAMPLE 3

0.50 g. of ammonium N-acetyl-L-α-aminophenylacetate is added to one ml. of water, and the mixture is heated at 150° C. for 4.5 hours in a sealed tube. The mixture is then treated in the same manner as described in Example 2. 0.45 g. of ammonium N-acetyl-DL-α-aminophenylacetate is obtained. Yield: 90%, M.P. 187° C. (decomp.). Specific rotation: $[\alpha]_D^{25}=+0.8°$ (c.=1, water). The degree of racemization: 99.6%.

EXAMPLE 4

0.2 g. of ammonium N-acetyl-D-α-aminophenylacetate is heated at 160° C. for six hours in a sealed tube. The crystals are dissolved in water. After decolorizing with activated carbon, the solution is concentrated to dryness. The residual crystals are washed with a small amount of acetone. 0.16 g. of ammonium N-acetyl-DL-α-aminophenylacetate is obtained. Yield: 80%, M.P. 190° C. (decomp.). Specific rotation: $[\alpha]_D^{25} = -139.8°$ (c.=1, water). The degree of racemization: 23.4%.

What we claim is:

1. A process for racemization of optically active ammonium N-acetyl-α-aminophenylacetate which comprises the step of heating said optically active ammonium N-acetyl-α-aminophenylacetate at a temperature of from about 100° C. to about the melting point of racemic ammonium N-acetyl-α-aminophenylacetate.

2. The process as claimed in claim 1, wherein said heating is carried out at a temperature of from 100° to 180° C.

3. The process as claimed in claim 1, wherein said heating is carried out at a temperature of from 140° to 180° C.

4. The process as claimed in claim 1, wherein said heating is carried out in the presence of water.

5. The process as claimed in claim 1, wherein said heating is carried out in the absence of water.

6. The process as claimed in claim 1, wherein said heating is conducted absent the presence of an acid or alkali.

7. The process as claimed in claim 1, wherein said heating is carried out in a sealed vessel.

References Cited

UNITED STATES PATENTS 3,401,178  9/1968  Firestone et al. ____ 260—518 R

LORRAINE A. WEINBERGER, Primary Examiner

L. A. THAXTON, Assistant Examiner